(12) United States Patent
Gaydos et al.

(10) Patent No.: US 11,633,940 B2
(45) Date of Patent: *Apr. 25, 2023

(54) COMPOSITIONALLY MODULATED ZINC-MANGANESE MULTILAYERED COATINGS

(71) Applicant: THE BOEING COMPANY, Chicago, IL (US)

(72) Inventors: Stephen P. Gaydos, St. Louis, MO (US); Vijaykumar S. Ijeri, Bangalore (IN); Om Prakash, Bangalore (IN); Shashi Kant Tiwari, Jamshedpur (IN); Raghuvir Singh, Jamshedpur (IN); Sharma Paswan, Jamshedpur (IN); Lokesh C. Pathak, Jamshedpur (IN)

(73) Assignee: THE BOEING COMPANY, Arlington, VA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/364,954

(22) Filed: Jul. 1, 2021

(65) Prior Publication Data
US 2021/0324531 A1  Oct. 21, 2021

Related U.S. Application Data

(62) Division of application No. 15/971,469, filed on May 4, 2018, now Pat. No. 11,066,752.

(30) Foreign Application Priority Data

Feb. 28, 2018 (IN) .............................. 201811007554

(51) Int. Cl.
B32B 15/01 (2006.01)
C25D 3/56 (2006.01)
(Continued)

(52) U.S. Cl.
CPC ............ *B32B 15/013* (2013.01); *C25D 3/565* (2013.01); *C25D 5/10* (2013.01); *C25D 5/18* (2013.01);
(Continued)

(58) Field of Classification Search
None
See application file for complete search history.

(56) References Cited

U.S. PATENT DOCUMENTS 5,043,230 A   8/1991   Jagannathan et al.
5,082,748 A   1/1992   Ahn et al.
(Continued)

FOREIGN PATENT DOCUMENTS

JP   H0379787 A   4/1991
JP   H0390591 A   4/1991
(Continued)

OTHER PUBLICATIONS

Boshkov, N. et al., "Corrosion behavior and protective ability of multilayer Galvanic coatings of Zn and Zn—Mn alloys in sulfate containing medium", Elsevier, Jan. 2006, pp. 5995-6001.
(Continued)

*Primary Examiner* — Wyatt P McConnell
(74) *Attorney, Agent, or Firm* — Patterson + Sheridan, LLP

(57) ABSTRACT

The present disclosure provides electrolyte solutions for electrodeposition of zinc-manganese alloys, methods of forming electrolyte solutions, methods of electrodepositing zinc-manganese alloys, and multilayered zinc-manganese alloys. An electrolyte solution for electroplating can include a metal salt, boric acid, an alkali metal chloride, polyethylene glycol, and a hydroxy benzaldehyde. An electrolyte solution can be formed by dissolving a metal salt, boric acid, an alkali metal chloride, polyethylene glycol, and a hydroxy
(Continued)

benzaldehyde in water or an aqueous solution. Electrodepositing zinc-manganese alloys on a substrate can include introducing a cathode and an anode into an electrolyte solution comprising a metal salt, boric acid, an alkali metal chloride, polyethylene glycol, and a hydroxy benzaldehyde. Electrodepositing can further include passing a current between the cathode and the anode through the electrolyte solution to deposit zinc and manganese onto the cathode.

20 Claims, 5 Drawing Sheets

(51) Int. Cl.
    *C25D 5/10*     (2006.01)
    *C25D 5/00*     (2006.01)
    *C25D 5/18*     (2006.01)
(52) U.S. Cl.
    CPC .......... *C25D 5/623* (2020.08); *B32B 2250/42* (2013.01); *B32B 2311/20* (2013.01)

(56) References Cited

U.S. PATENT DOCUMENTS

| | | |
|---|---|---|
| 7,070,689 B2 | 7/2006 | Thiery |
| 11,066,752 B2 * | 7/2021 | Gaydos ................ B32B 15/013 |
| 2010/0236936 A1 * | 9/2010 | Brunner ................ C25D 3/565 |
| | | 205/244 |

FOREIGN PATENT DOCUMENTS

| | | |
|---|---|---|
| JP | H07278875 A | 10/1995 |
| WO | 1991017884 A1 | 11/1991 |

OTHER PUBLICATIONS

Bucko, M. et al., "Initial corrosion protection of Zn—Mn alloyals electrodeposited from alkaline solution", Elsevier, May 2011, pp. 2861-2871.

Boshkov, N., "Galvanic Zn—Mn alloys-electrodeposition, phase composition, corrosion behaviour and protective ability", Elsevier, Mar. 2003, pp. 217-226.

Ganesan, Selvarani, "Electrodeposition and characterization of Zn—Mn coatings for corrosion protection", Elsevier, Jan. 2014, pp. 143-151.

Gabe, D. R. et al., "Zinc-Manganese Alloy Electrodeposition", Elsevier, Aug. 1993, pp. 33-36.

Bucko, M. et al., "Electrodeposition of Zn—Mn alloys at high currect densities from chloride electrolyte", Springer, Jan. 2013, pp. 1409-1419.

Paulo Sergio da Silva et al., "Electrodeposition of Zn and Zn—Mn alloy coatings from an electrolytic bath prepared by recovery of exhausted zinc-carbon batteries," Journal of Power Sources, Dated: Jul. 15, 2012, pp. 116-121.

Intellectual Property India, Examination Report under Sections 12 & 13 of the Patents Act, 1970 and The Patents Rules, 2003 for Application 201811007554 dated Feb. 17, 2022.

* cited by examiner

COMPOSITIONALLY MODULATED ZINC-MANGANESE MULTILAYERED COATINGS

CROSS-REFERENCE TO RELATED APPLICATIONS

This application is a divisional application of co-pending U.S. application Ser. No. 15/971,469, filed May 4, 2018, which claims the benefit of Indian Provisional Application Number 201811007554, filed Feb. 28, 2018, each of which are herein incorporated by reference in their entirety.

FIELD

The present disclosure provides electrolyte solutions for electrodeposition of zinc-manganese alloys, methods of forming electrolyte solutions, methods of electrodepositing zinc-manganese alloys, and multilayered zinc-manganese alloys.

BACKGROUND

Development of corrosion resistant coatings is of commercial interest in, for example, the aerospace and automobile industries. In particular, the development of zinc (Zn) coatings has been an area of interest for protection of aerospace and automobile components made of steel. To further improve the corrosion resistance of zinc coatings, zinc alloys can be electrodeposited onto a steel substrate. For example, zinc-nickel (Zn—Ni) alloy has been used in the production of steel sheets for automobile bodies and also for small components such as nuts and bolts. Nonetheless, coatings having further improvement in corrosion resistance and free from nickel are of interest.

The mechanism of corrosion protection of steel, for example, by zinc is dependent on the galvanic sacrificial nature of zinc toward steel. The protection can be affected if zinc becomes noble toward steel by the effect of ions in solution, the formation of a passive film or by increased temperature. Zinc-nickel, zinc-cobalt, zinc-tin, and zinc-manganese alloys all become increasingly noble as the alloy content increases and at a critical content will cease to sacrificially protect steel. They also become intrinsically slower to dissolve, which is another protection factor. Consequently, a critical alloy content can exist (e.g., 15% nickel in zinc) for maximum protective ability.

Zinc-manganese alloys, for example, can be deposited onto substrates by electrodeposition using an electrolyte solution. Furthermore, the service life of pure zinc coatings can be enhanced by passivation processes such as chrome passivation and silicating processes. However, zinc-manganese alloys are not easily receptive to (e.g., have poor adhesion to), for example, trichrome passivation coatings, because of poor reactivity.

Therefore, there is a need in the art for improved electrolyte solutions for electrodeposition of zinc-manganese alloys, methods of forming electrolyte solutions, methods of electrodepositing zinc-manganese alloys, and multilayered zinc-manganese alloys.

SUMMARY

The present disclosure provides electrolyte solutions for electrodeposition of zinc-manganese alloys, methods of forming electrolyte solutions, methods of electrodepositing zinc-manganese alloys, and multilayered zinc-manganese alloys.

At least one electrolyte solution for electroplating includes a metal salt, boric acid, an alkali metal chloride, polyethylene glycol, and a hydroxy benzaldehyde.

At least one electrolyte solution is formed by dissolving a metal salt, boric acid, an alkali metal chloride, polyethylene glycol, and a hydroxy benzaldehyde.

At least one electrolyte solution for electroplating includes a zinc salt, a manganese salt, and an alkali metal citrate.

At least one electrolyte solution is formed by dissolving a zinc salt, a manganese salt, and an alkali metal citrate.

At least one electrolyte solution for electroplating includes a zinc salt, a manganese salt, an alkali metal citrate, an alkali metal acetate, a citric acid, glycine, and thiamine hydrochloride.

At least one electrolyte solution is formed by dissolving a zinc salt, a manganese salt, an alkali metal citrate, an alkali metal acetate, a citric acid, glycine, and thiamine hydrochloride.

At least one method for electrodepositing a zinc-manganese alloy on a substrate includes introducing a cathode and an anode into an electrolyte solution comprising a zinc salt, a manganese salt, and an electrolyte or additive selected from (a) boric acid, an alkali metal chloride, polyethylene glycol, and a hydroxy benzaldehyde; (b) an alkali metal citrate; or (c) an alkali metal citrate, an alkali metal acetate, a citric acid, glycine, and a thiamine. A current is introduced between the cathode and the anode through the electrolyte solution to deposit zinc and manganese onto the cathode.

At least one substrate includes a zinc-manganese coating comprising a plurality of alternating layers.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
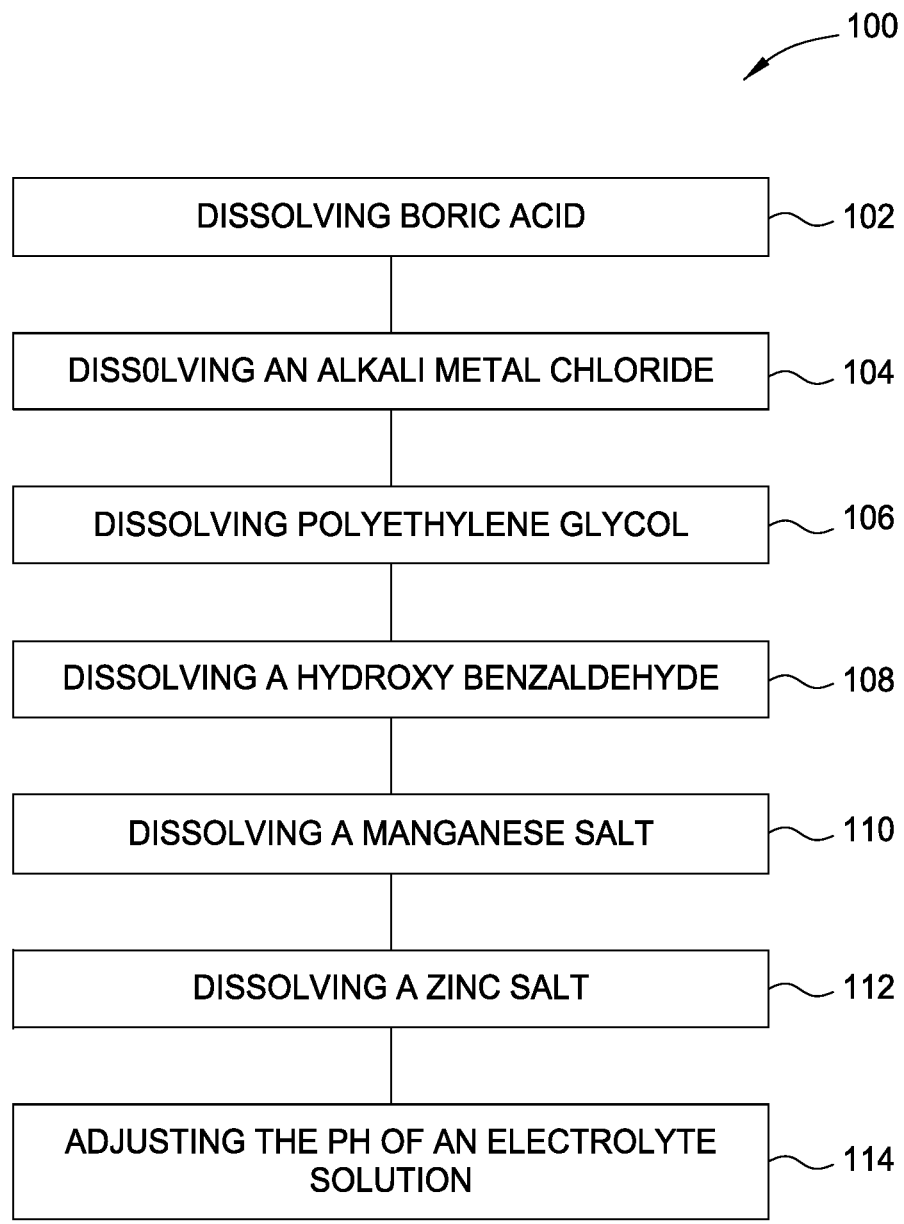
FIG. 1 is a flow diagram illustrating a method for forming an electrolyte solution according to an aspect of the present disclosure.

The present disclosure provides electrolyte solutions for electrodeposition of zinc-manganese alloys, methods of forming zinc-manganese alloys, and multilayered zinc-manganese alloys. Zinc-manganese alloys formed by methods of the present disclosure are receptive to conversion coatings (as evidenced by improved OCP and corrosion resistance, providing passivated zinc-manganese alloys that are resistant to corrosion in a salt spray chamber for 750 hours or greater, such as 1,000 hours or greater. As used herein, a "conversion coating" is a coating derived from reaction of substrate (usually zinc, aluminum) with the coating material. For example, in Chromate Conversion Coatings (CCC), the reaction between Zn/Zn alloy or Al/Al alloy substrates and chromium species in chromating solution form the CCC. Conversion coatings can also be referred to as passivation coatings. In at least one aspect, a conversion coating is selected from a hexavalent or trivalent chromium based solution.

In at least one aspect, electrolyte solutions of the present disclosure are aqueous. In at least one aspect, an electrolyte solution comprises a zinc salt, such as zinc sulphate or zinc chloride, and a manganese salt, such as manganese sulphate and manganese chloride. Electrolyte solutions of the present disclosure can further comprise at least one additive selected from polyethylene glycol and a hydroxy benzaldehyde (such as para-hydroxy benzaldehyde). Electrolyte solutions of the present disclosure further comprise at least one buffering agent selected from boric acid, potassium chloride, citric acid, an alkali metal acetate, and an alkali metal citrate.

Electrolyte solutions of the present disclosure provide corrosion resistant zinc-manganese alloys deposited on a substrate and are receptive to conversion coatings. In at least one aspect, a substrate is a steel substrate, copper substrate, brass substrate, copper-coated substrate, nickel-coated substrate, or other metal or metal alloy-containing substrate. In at least one aspect, manganese content of a zinc-manganese alloy of the present disclosure is from about 0.1 wt % manganese to about 20 wt % manganese based on the total weight of the alloy. Changes in manganese deposition can be less affected at lower pH, such as 3-4, but manganese deposition can be more affected at higher pH such as 5-6. Lower pH can decrease amount of deposition of manganese content and higher pH can cause precipitation in the electrolyte bath and poor deposits.

Zinc-manganese alloy coatings of the present disclosure provide high corrosion resistance for substrates, such as steel substrates (for example, no red rust observed after salt spray testing for 500 hours or more, and in some examples 1,000 hours or more), and pass a number of tests for use as coatings such as hydrogen embrittlement and salt spray tests. Zinc-manganese alloys of the present disclosure may be disposed on components of aircraft, spacecraft, watercraft, engine and blown-flap, exhaust-washed structures, warm-structure components for high-performance supersonic, hypersonic, and space re-entry vehicle structures, automobile parts, architectural structures such as steel bridges and propulsion structures such as power-generation turbines, vehicle engines, alternative-energy applications, and related technologies. As one specific example, alloys of the present disclosure may be disposed on steel-based landing gears and/or a bottom surface of an aircraft.

In at least one aspect, the zinc-manganese coatings of the present disclosure are multilayered electrodeposited coatings referred to as composition modulated multilayered alloy (CMMA) coatings. CMMA coatings are one way to improve the corrosion resistance capability of a coating as compared to, for example, a monolithic zinc-nickel alloy coating. CMMA coatings have a plurality of thin alternating metal layers or alloy layers, and each layer plays its own distinctive role in achieving preferred performances. For example, a zinc-manganese alloy layer has a barrier effect (a barrier against moisture exposure of the substrate) for protection of a steel substrate while the zinc metal in the layer has a sacrificial effect (e.g., degrades over time). Such CMMA coatings typically have improved corrosion resistance as compared to monolithic coatings of the same thickness as the CMMA coating. For CMMA coatings, each layer has a different corrosion potential relative to an adjacent layer. Therefore, the corrosion current that is flowing will be blocked by an adjacent layer having a different corrosion potential, which reduces or prevents corrosion potential from reaching the substrate. Without being bound by theory, it is also believed that the less noble layer (e.g., layer having less manganese content) corrodes preferentially and the corrosion products block the pores of an adjacent layer, thereby making it protective.

In at least one aspect, CMMA coatings of the present disclosure are formed using a single bath technique. The deposition vessel is a glass beaker at a lab scale or large polypropylene tanks for plating on a commercial scale. In at least one aspect, the deposition vessel contains an electrolyte solution that is prepared by mixing all ingredients of the electrolyte solution concurrently or in a stepwise manner starting with the complexing agents followed by zinc and manganese salts. The anode (graphite or zinc) is introduced into the beaker containing electrolyte solution. The deposition process is modulated by altering the pulse sequence (from low current density to high current density, or from high current density to low current density) which creates the successive layers of alternating metal composition (e.g., alternating layers having different manganese content). The thickness of each layer can be controlled by the duration of the energy pulse applied to the electrolyte solution electrodes. In at least one aspect, the total thickness of a CMMA coating is from about 1 micron to about 100 microns, such as from about 10 microns to about 50 microns, such as from about 15 microns to about 40 microns, for example about 20 microns. The thickness of the individual CMMA layers may range from 0.1 to 5 microns by varying the current density, time of deposition and pulse duration. In at least one aspect, CMMA coatings of the present disclosure have one or more passivation/conversion coatings disposed thereon. Such coatings include Hex-chrome or Tri-chrome based passivation/conversion coatings that are commercially available. CMMA coatings of the present disclosure are receptive to conversion coatings (as evidenced by improved corrosion resistance), providing passivated zinc-manganese alloys that are resistant to corrosion in a salt spray chamber for 750 hours or greater, such as 1,000 hours or greater.

CMMA coatings of the present disclosure can comprise a plurality of alternating layers where:
   (1) the alternating layers have the same thickness and the same composition (e.g., manganese content);

(2) the alternating layers have the same thickness but have a different composition (e.g., two or more of the layers have a different manganese content);
(3) the alternating layers have different thickness (e.g., two or more of the layers have a different thickness) and have different composition;
(4) the alternating layers each have a different thickness, but the plurality of layers includes two different alternating compositions (e.g., a first layer has a first manganese content, a second layer has a second manganese content, and a third layer has the first manganese content (i.e., the third layer has the same manganese content the first layer);
(5) the alternating layers each have the same thickness, but each composition of each layer differs from the composition of the other layers (e.g., a graded alloy composition);
(6) the alternating layers each have a different thickness and each composition of each layer differs from the composition and thickness of the other layers (also a graded alloy composition).

Varying the thickness and composition of a CMMA coating can be controlled by current density and time scale of a deposition process of the present disclosure.

In at least one aspect, an electrolyte solution is aqueous and comprises a metal salt. As used herein, "metal salt" can include anhydrous and/or hydrate forms of a metal salt.

In at least one aspect, an electrolyte solution comprises a zinc salt, such as zinc sulphate or zinc chloride, and a manganese salt, such as manganese sulphate and manganese chloride. Electrolyte solutions of the present disclosure can further comprise at least one surfactant or brightener, selected from polyethylene glycol and a hydroxy benzaldehyde (such as para-hydroxy benzaldehyde). Alternatively, electrolyte solutions of the present disclosure further comprise at least one complexing agent selected from glycine and thiamine hydrochloride (THC). Complexing agents, such as glycine, coordinate to manganese ions in an electrolyte solution and also promote controllable manganese deposition on a substrate upon application of a current density to the electrolyte solution.

Electrolyte solutions of the present disclosure further comprise at least one buffering agent selected from boric acid, potassium chloride, citric acid, sodium acetate, and sodium citrate. Buffering agents of the present disclosure maintain a desirable pH of the electrolyte solution and do not substantially interfere with manganese deposition on a substrate. In at least one aspect, the pH of electrolyte solutions of the present disclosure are between about 2 and about 6, such as between about 4 and about 6, for example the pH is 5 or 5.4. In at least one aspect, the pH of electrolyte solutions of the present disclosure are controlled by addition of one or more bases, such as a sodium hydroxide (NaOH) solution, to increase the pH of the solution or addition of one or more acids, such as a sulfuric acid ($H_2SO_4$) solution, to decrease the pH of the solution. pH is also maintained by appropriate combinations of alkali metal citrate, citric acid, and boric acid. Zinc salts, manganese salts, complexing agents, buffering agents, acids, and bases can be obtained from any suitable commercial source, such as MERCK-India or Sigma-Aldrich Co. LLC of St. Louis, Mo.

Electrodeposition can include preparing an electrolyte solution and passing current between an anode and a cathode in the electrolyte solution. FIG. 1 is a flow diagram illustrating a method 100 for forming an electrolyte solution. The order of mixing need not necessarily be the same. For example, blocks 102, 104, 106, 108, 110, 112, 114 may be interchanged or all of the components can be mixed together at once.

Method 100 includes dissolving boric acid in water in a vessel (Block 102), such as a beaker, to form a first electrolyte solution. In at least one aspect, the boric acid is dissolved in water or aqueous solution, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the boric acid has been dissolved.

In at least one aspect, the concentration of boric acid in an electrolyte solution of the present disclosure is from about 0.2 moles per liter (mol/L) to about 0.6 mol/L, such as from about 0.3 mol/L to about 0.5 mol/L, such as from about 0.35 mol/L to about 0.45 mol/L of the electrolyte solution, for example about 0.4 mol/L.

Method 100 further includes dissolving an alkali metal chloride in water or an aqueous solution (such as the first solution) to form an electrolyte solution (e.g., a second electrolyte solution) (Block 104). In at least one aspect, an alkali metal chloride is sodium chloride, potassium chloride, and/or other alkali metal chloride. In at least one aspect, an alkali metal chloride includes its respective hydrated forms. For example sodium chloride has the formula $NaCl.xH_2O$, where x is a whole number (e.g., 0 or 1). In at least one aspect, the alkali metal chloride is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the alkali metal acetate has been dissolved.

In at least one aspect, the concentration of an alkali metal chloride in an electrolyte solution of the present disclosure is from about 1 moles per liter (mol/L) to about 3 mol/L, such as from about 1.5 mol/L to about 2.5 mol/L, such as from about 1.7 mol/L to about 1.9 mol/L of the electrolyte solution, for example about 1.8 mol/L.

Method 100 further includes dissolving polyethylene glycol, for example, in water or an aqueous solution (such as the second solution to form an electrolyte solution, (e.g., a third electrolyte solution) (Block 106). Polyethylene glycol can have a number average molecular weight (Mw) of from about 2,000 g/mol to about 10,000 g/mol, such as from about 4,000 g/mol to about 8,000 g/mol, such as from about 5,000 g/mol to about 7,000 g/mol, for example about 6,000 g/mol. In at least one aspect, polyethylene glycol is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the polyethylene glycol has been dissolved.

In at least one aspect, the concentration of polyethylene glycol in an electrolyte solution of the present disclosure is from about 0.0001 moles per liter (mol/L) to about 0.01 mol/L, such as from about 0.0005 mol/L to about 0.01 mol/L, such as from about 0.0008 mol/L to about 0.0015 mol/L of the electrolyte solution, for example about 0.001 mol/L.

Method 100 further includes dissolving a hydroxy benzaldehyde in water or an aqueous solution (such as the third solution) to form an electrolyte solution (e.g., a fourth electrolyte solution) (Block 108). In at least one aspect, a hydroxy benzaldehyde is selected from para-hydroxy benzaldehyde, ortho-hydroxy benzaldehyde, and meta-hydroxy benzaldehyde. In at least one aspect, a hydroxy benzaldehyde is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the hydroxy benzaldehyde has been dissolved.

In at least one aspect, the concentration of a hydroxy benzaldehyde in an electrolyte solution of the present disclosure is from about 0.0001 moles per liter (mol/L) to about 0.01 mol/L, such as from about 0.001 mol/L to about 0.01 mol/L, such as from about 0.002 mol/L to about 0.006 mol/L of the electrolyte solution, for example about 0.004 mol/L.

Method 100 further includes dissolving a manganese salt in water or an aqueous solution (such as the fourth solution) to form an electrolyte solution (e.g., a fifth electrolyte solution) (Block 110). In at least one aspect, the manganese salt is a divalent manganese salt. In at least one aspect, a divalent manganese salt includes manganese (II) sulfate, manganese (II) chloride, manganese (II) acetate, and/or other divalent manganese salt. Each of these divalent manganese salts can include its respective hydrated forms. For example, manganese (II) sulfate has the formula $MnSO_4 \cdot xH_2O$, where x is a whole number (e.g., 0, 1, 2, 4, 5, 6, or 7). Accordingly, in at least one aspect, manganese (II) sulfate is anhydrous manganese (II) sulfate, manganese (II) sulfate monohydrate, manganese (II) sulfate dihydrate, manganese (II) sulfate tetrahydrate, manganese (II) sulfate pentahydrate, manganese (II) sulfate hexahydrate, manganese (II) sulfate heptahydrate, or manganese (II) sulfate with another hydration state. Alternatively, manganese (II) chloride is anhydrous manganese (II) chloride, manganese (II) chloride monohydrate, manganese (II) chloride dihydrate, manganese (II) chloride tetrahydrate, manganese (II) chloride pentahydrate, manganese (II) chloride hexahydrate, manganese (II) chloride heptahydrate, or manganese (II) chloride with another hydration state. In at least one aspect, the manganese salt is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the manganese salt has been dissolved.

In at least one aspect, the concentration of an manganese salt in an electrolyte solution of the present disclosure is from about 1.5 moles per liter (mol/L) to about 3 mol/L, such as from about 1.7 mol/L to about 2 mol/L, such as from about 0.1 mol/L to about 0.5 mol/L, such as from about 0.2 mol/L to about 0.4 mol/L of the electrolyte solution, for example about 1.8 mol/L or about 0.25 mol/L.

Method 100 further includes dissolving a zinc salt, for example, in water or an aqueous solution (such as the fifth solution) to form an electrolyte solution (e.g., a sixth electrolyte solution) (Block 112). The zinc salt can be a divalent zinc salt. In at least one aspect, a divalent zinc salt is zinc (II) sulfate, zinc (II) chloride, zinc (II) acetate, and/or other divalent zinc salt. In at least one aspect, each of these divalent zinc salts include its respective hydrated forms. For example, zinc (II) sulfate has the formula $ZnSO_4 \cdot xH_2O$, where x is a whole number (e.g., 0, 1, 2, 4, 5, 6, or 7). Accordingly, in at least one aspect, zinc (II) sulfate is anhydrous zinc (II) sulfate, zinc (II) sulfate monohydrate, zinc (II) sulfate dihydrate, zinc (II) sulfate tetrahydrate, zinc (II) sulfate pentahydrate, zinc (II) sulfate hexahydrate, zinc (II) sulfate heptahydrate, or zinc (II) sulfate with another hydration state. Alternatively, zinc (II) chloride is anhydrous zinc (II) chloride, zinc (II) chloride monohydrate, zinc (II) chloride dihydrate, zinc (II) chloride tetrahydrate, zinc (II) chloride pentahydrate, zinc (II) chloride hexahydrate, zinc (II) chloride heptahydrate, or zinc (II) chloride with another hydration state. In at least one aspect, the zinc salt is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the zinc salt has been dissolved.

In at least one aspect, the concentration of a zinc salt in an electrolyte solution of the present disclosure is from about 0.01 moles per liter (mol/L) to about 0.5 mol/L, such as from 0.1 mol/L to about 0.4 mol/L, such as from about 0.15 mol/L to about 0.3 mol/L, such as from 0.2 mol/L to about 0.3 mol/L of the electrolyte solution, for example about 0.25 mol/L or about 0.3 mol/L.

Method 100 further includes adjusting the pH of the electrolyte solution using one or more aqueous acid solutions or aqueous base solutions (Block 114), such as potassium hydroxide (KOH), sodium hydroxide (NaOH), and/or sulfuric acid ($H_2SO_4$). The volume of aqueous acid solution or aqueous base solution added to the electrolyte solution is sufficiently small such that the concentration of other components (complexing agents, buffering agents, etc.) of the electrolyte solution is not substantially affected. Alternatively, solid potassium hydroxide and/or solid sodium hydroxide is added directly to the electrolyte solution and/or concentrated sulfuric acid is added directly to the electrolyte solution. In at least one aspect, the pH of the electrolyte solution is adjusted to a target pH from about 2 to about 7, such as from about 3 to about 6, such as from about 4 to about 5.5, for example about 5 or about 5.4. In at least one aspect, the pH of an electrolyte solution of the present disclosure is adjusted before passing a current through the electrolyte solution. In at least one aspect, the pH of an electrolyte solution of the present disclosure is maintained at a target pH or a target pH range during the passing of a current through the electrolyte solution.

Furthermore, in at least one aspect, methods of the present disclosure include dissolving an alkali metal citrate, for example, in water or an aqueous solution to form an electrolyte solution. Alkali metal citrates include sodium citrate, potassium citrate, and hydrated forms of an alkali metal citrate. An alkali metal citrate can be dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the alkali metal citrate has been dissolved.

In at least one aspect, the concentration of alkali metal citrate in an electrolyte solution of the present disclosure is from about 0.1 moles per liter (mol/L) to about 1 mol/L, such as from 0.3 mol/L to about 0.8 mol/L, such as from about 0.5 mol/L to about 0.7 mol/L of the electrolyte solution, for example about 0.6 mol/L.

Figure 2:
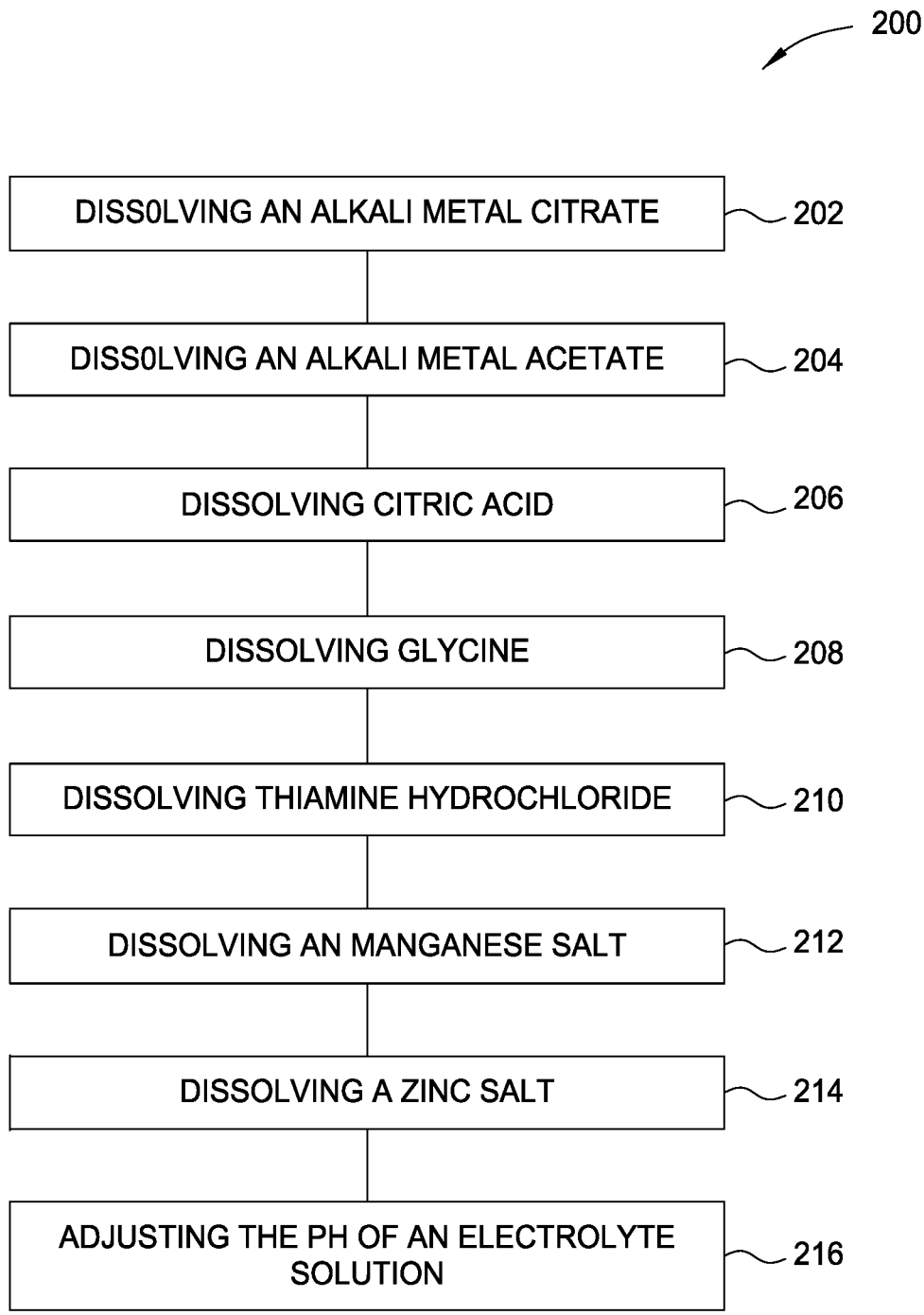
FIG. 2 is a flow diagram illustrating a method for forming an electrolyte solution according to an aspect of the present disclosure.

FIG. 2 is a flow diagram illustrating an alternative method 200 for forming an electrolyte solution. Method 200 includes dissolving 202 an alkali metal citrate in water in a vessel, such as a beaker, to form a first electrolyte solution. In at least one aspect, an alkali metal citrate is a sodium citrate, potassium citrate, and/or other alkali metal citrate. Sodium citrates include citric acid trisodium salt, citric acid disodium salt, citric acid monosodium salt, or other sodium citrate. Potassium citrates include citric acid tripotassium salt, citric acid dipotassium salt, citric acid monopotassium salt, or other potassium citrate. In at least one aspect, an alkali metal citrate includes its respective hydrated forms. For example, citric acid trisodium salt has the formula $Na_3C_6H_5O_7 \cdot xH_2O$, where x is a whole number (e.g., 0, 1, or 2). Accordingly, citric acid trisodium salt can be, for example, anhydrous citric acid trisodium salt, citric acid trisodium salt monohydrate, or citric acid trisodium salt dihydrate. In at least one aspect, the alkali metal citrate is dissolved in water or aqueous solution, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the alkali metal citrate has been dissolved.

In at least one aspect, the concentration of an alkali metal citrate in an electrolyte solution of the present disclosure is from about 0.01 moles per liter (mol/L) to about 1.0 mol/L, such as from about 0.01 mol/L to about 0.05 mol/L, such as from about 0.01 mol/L to about 0.03 mol/L of the electrolyte solution, for example about 0.01 mol/L, about 0.018 mol/L, about 0.2 mol/L, or about 0.6 mol/L.

Method 200 further includes dissolving 204 an alkali metal acetate, for example, in water or an aqueous solution (such as the first solution) to form an electrolyte solution (e.g., a second electrolyte solution). In at least one aspect, an alkali metal acetate is a sodium acetate, potassium acetate, and/or other alkali metal acetate. Sodium acetates include acetic acid sodium salt. Potassium acetate include acetic acid potassium salt. In at least one aspect, an alkali metal acetate includes its respective hydrated forms. For example acetic acid sodium salt has the formula $CH_3COONa \cdot xH_2O$, where x is a whole number (e.g., 0, 1, or 2). In at least one aspect, the alkali metal acetate is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the alkali metal acetate has been dissolved.

In at least one aspect, the concentration of an alkali metal acetate in an electrolyte solution of the present disclosure is from about 0.1 moles per liter (mol/L) to about 2 mol/L, such as from 0.2 mol/L to about 1 mol/L, such as from about 0.5 mol/L to about 0.8 mol/L of the electrolyte solution, for example about 0.1 mol/L, about 0.65 mol/L, about 0.75 mol/L, about 0.85 mol/L, or about 1 mol/L.

Method 200 further includes dissolving 206 citric acid, for example, in water or an aqueous solution (such as the second solution to form an electrolyte solution, (e.g., a third electrolyte solution). In at least one aspect, citric acid can includes its respective hydrated forms. For example, citric acid has the formula $C_6H_8O_7 \cdot xH_2O$, where x is a whole number (e.g., 0, 1, or 2). In at least one aspect, citric acid is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the citric acid has been dissolved.

In at least one aspect, the concentration of citric acid in an electrolyte solution of the present disclosure is from about 0.01 moles per liter (mol/L) to about 0.3 mol/L, such as from about 0.05 mol/L to about 1 mol/L, such as from about 0.1 mol/L to about 0.5 mol/L of the electrolyte solution, for example about 0.01 mol/L, about 0.08 mol/L, about 0.1 mol/L, about 0.12 mol/L, or about 0.3 mol/L.

Method 200 further includes dissolving 208 glycine, for example, in water or an aqueous solution (such as the third solution) to form an electrolyte solution (e.g., a fourth electrolyte solution). In at least one aspect, glycine includes its respective salt forms. In at least one aspect, glycine is one or more of glycine sodium salt, glycine potassium salt, and glycine zinc salt. Glycine zinc salt can participate as a source of zinc ions in the electrolyte solution for zinc deposition onto a substrate. In at least one aspect, glycine includes its respective hydrated forms. For example, glycine has the formula $NH_2CH_2COOH \cdot xH_2O$, where x is a whole number (e.g., 0, 1, or 2). In at least one aspect, glycine is dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the glycine has been dissolved.

In at least one aspect, the concentration of glycine in an electrolyte solution of the present disclosure is from about 0.01 moles per liter (mol/L) to about 1 mol/L, such as from 0.1 mol/L to about 1 mol/L, such as from about 0.12 mol/L to about 0.2 mol/L of the electrolyte solution, for example about 0.01 mol/L, about 0.13 mol/L, about 0.14 mol/L, about 0.15 mol/L, or about 0.2 mol/L.

Method 200 further includes dissolving 210 thiamine hydrochloride or thiamine, for example, in water or an aqueous solution (such as the fourth solution) to form an electrolyte solution (e.g, a fifth electrolyte solution). The combination of citric acid and thiamine hydrochloride, for example, act as a brightening agent for a deposited alloy. In at least one aspect, thiamine hydrochloride or thiamine include their respective hydrated forms. For example, thiamine hydrochloride has the formula $C_{12}H_{17}ClN_4OS \cdot HCl \cdot xH_2O$, where x is a whole number (e.g., 0, 1, or 2). In at least one aspect, thiamine hydrochloride or thiamine are dissolved, for example, by stirring at a temperature from about 20° C. to about 30° C., such as about 25° C. In at least one aspect, stirring is performed for from about 5 minutes to about 60 minutes, such as from about 10 minutes to about 50 minutes, such as from about 20 minutes to about 40 minutes or until substantially all of the thiamine hydrochloride or thiamine has been dissolved.

In at least one aspect, the concentration of thiamine hydrochloride in an electrolyte solution of the present disclosure is from about 0.001 moles per liter (mol/L) to about 0.005 mol/L, such as from about 0.001 mol/L to about 0.003 mol/L of the electrolyte solution, for example about 0.0014 mol/L, about 0.0015 mol/L, about 0.0016 mol/L, or about 0.005 mol/L. In at least one aspect, the concentration of thiamine in an electrolyte solution of the present disclosure is from about 0.01 g/L to about 2 g/L, such as from 0.1 g/L to about 1 g/L, such as from 0.3 g/L to about 0.7 g/L, for example about 0.01 g/L, about 0.4 g/L, about 0.5 g/L, about 0.6 g/L, or about 2 g/L.

Method 200 further includes dissolving 212 a manganese salt in water or an aqueous solution (such as the fifth solution) to form an electrolyte solution (e.g., a sixth electrolyte solution).

n at least one aspect, the manganese salt is a divalent manganese salt. In at least one aspect, a divalent manganese salt includes manganese (II) sulfate, manganese (II) chloride, manganese (II) acetate, and/or other divalent manganese salt. Each of these divalent manganese salts can include its respective hydrated forms. For example, manganese (II) sulfate has the formula $MnSO_4 \cdot xH_2O$, where x is a whole number (e.g., 0, 1, 2, 4, 5, 6, or 7). Accordingly, in at least one aspect, manganese (II) sulfate is anhydrous manganese (II) sulfate, manganese (II) sulfate monohydrate, manganese (II) sulfate dihydrate, manganese (II) sulfate tetrahydrate, manganese (II) sulfate pentahydrate, manganese (II) sulfate hexahydrate, manganese (II) sulfate heptahydrate, or manganese (II) sulfate with another hydration state. Alternatively, manganese (II) chloride is anhydrous manganese (II) chloride, manganese (II) chloride monohydrate, manganese (II) chloride dihydrate, manganese (II) chloride tetrahydrate, manganese (II) chloride pentahydrate, manganese (II) chloride hexahydrate, manganese (II) chloride heptahydrate, or manganese (II) chloride with another hydration state. In at least one aspect, the manganese salt is dissolved, for example, by stirring at a temperature from about 20° C. to about 40° C., such as about 25° C. In at least one aspect, stirring is performed for from about 5 minutes to about 60 minutes, such as from about 10 minutes to about 50 minutes, such as from about 20 minutes to about 40 minutes or until substantially all of the manganese salt has been dissolved.

In at least one aspect, the concentration of an manganese salt in an electrolyte solution of the present disclosure is from about 0.1 moles per liter (mol/L) to about 1 mol/L, such as from about 0.4 mol/L to about 0.7 mol/L, such as from about 0.5 mol/L to about 0.6 mol/L, for example about 0.58 mol/L, about 0.59 mol/L or about 0.25 mol/L.

Method 200 further includes dissolving 214 a zinc salt, for example, in water or an aqueous solution (such as the sixth solution) to form an electrolyte solution (e.g., a seventh electrolyte solution). The zinc salt can be a divalent zinc salt. In at least one aspect, a divalent zinc salt is zinc (II) sulfate, zinc (II) chloride, zinc (II) acetate, and/or other divalent zinc salt. In at least one aspect, each of these divalent zinc salts include its respective hydrated forms. For example, zinc (II) sulfate has the formula $ZnSO_4 \cdot xH_2O$, where x is a whole number (e.g., 0, 1, 2, 4, 5, 6, or 7). Accordingly, in at least one aspect, zinc (II) sulfate is anhydrous zinc (II) sulfate, zinc (II) sulfate monohydrate, zinc (II) sulfate dihydrate, zinc (II) sulfate tetrahydrate, zinc (II) sulfate pentahydrate, zinc (II) sulfate hexahydrate, zinc (II) sulfate heptahydrate, or zinc (II) sulfate with another hydration state. In at least one aspect, the zinc salt is dissolved, for example, by stirring at a temperature from about 20° C. to about 40° C., such as about 25° C. In at least one aspect, stirring is performed for from about 5 minutes to about 60 minutes, such as from about 10 minutes to about 50 minutes, such as from about 20 minutes to about 40 minutes or until substantially all of the zinc salt has been dissolved.

In at least one aspect, the concentration of a zinc salt in an electrolyte solution of the present disclosure is from about 0.01 moles per liter (mol/L) to about 0.5 mol/L, such as from 0.1 mol/L to about 0.4 mol/L, such as from about 0.15 mol/L to about 0.3 mol/L, such as from 0.15 mol/L to about 0.2 mol/L of the electrolyte solution, for example about 0.01 mol/L, about 0.16 mol/L, 0.17 mol/L, about 0.18 mol/L, or about 0.5 mol/L.

Method 200 further includes adjusting 216 the pH of the electrolyte solution using one or more aqueous acid solutions or aqueous base solutions, such as potassium hydroxide (KOH), sodium hydroxide (NaOH), and/or sulfuric acid ($H_2SO_4$). The volume of aqueous acid solution or aqueous base solution added to the electrolyte solution is sufficiently small such that the concentration of other components (complexing agents, buffering agents, etc.) of the electrolyte solution is not substantially affected. Alternatively, solid potassium hydroxide and/or solid sodium hydroxide is added directly to the electrolyte solution and/or concentrated sulfuric acid is added directly to the electrolyte solution. In at least one aspect, the pH of the electrolyte solution is adjusted to a target pH from about 2 to about 7, such as from about 3 to about 6, such as from about 4 to about 6, for example about 5 or about 5.4. In at least one aspect, the pH of an electrolyte solution of the present disclosure is adjusted before passing a current through the electrolyte solution (as described in more detail below). In at least one aspect, the pH of an electrolyte solution of the present disclosure is maintained at a target pH or a target pH range during the passing of a current through the electrolyte solution.

Figure 3:
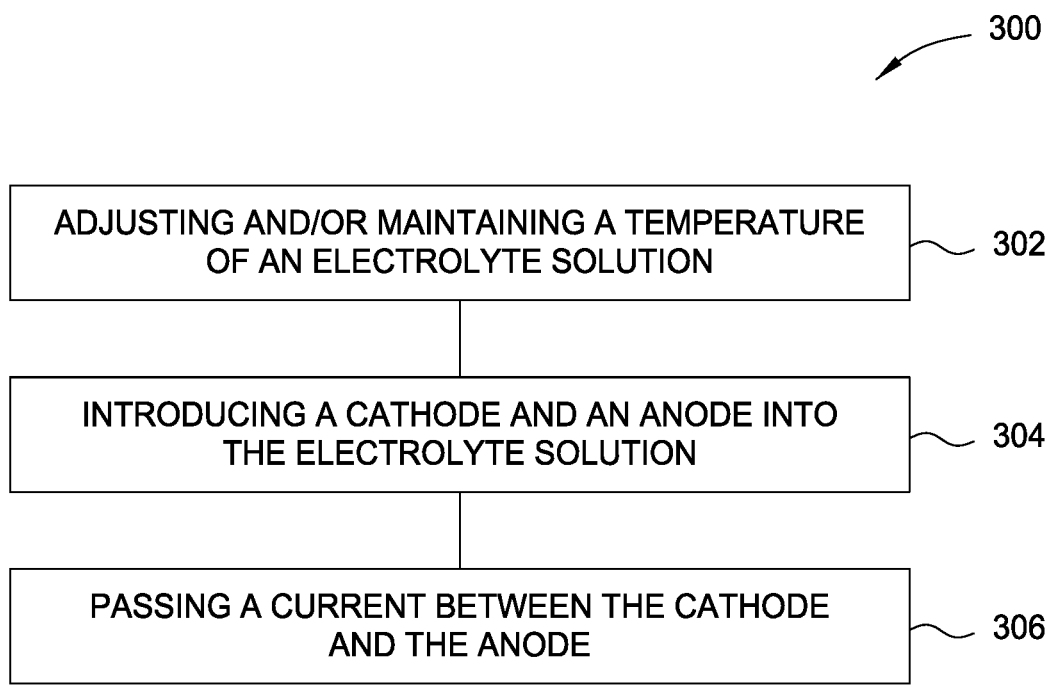
FIG. 3 is a flow diagram illustrating a method for forming a zinc-manganese coating of the present disclosure on a substrate by electrodeposition according to an aspect of the present disclosure.

FIG. 3 is a flow diagram illustrating a method 300 for forming a zinc-manganese coating of the present disclosure on a substrate by electrodeposition. Method 300 includes adjusting and/or maintaining a temperature of an electrolyte solution (Block 302), such as an electrolyte solution formed by method 100 or method 200. The temperature may be adjusted to/maintained at a target temperature of from about 20° C. to about 70° C., such as from about 20° C. to about 40° C., such as from about 20° C. to about 35° C., for example 20° C., 25° C., or 30° C., using any suitable heating or cooling apparatus. In at least one aspect, the temperature of an electrolyte solution is adjusted before passing a current through the electrolyte solution. In at least one aspect, the temperature of an electrolyte solution is maintained during the passing of a current through an electrolyte solution to maintain the appearance of a deposited layer. Maintaining the temperature within a desirable range promotes obtaining reproducible results in terms of appearance and alloy composition.

Method 300 further includes introducing a cathode and an anode into the electrolyte solution (Block 304), the cathode including the substrate, and passing a current between the cathode and the anode through the electrolyte solution to deposit zinc and manganese onto the cathodic substrate (Block 306). In at least one aspect, the cathodic substrate is, for example, a steel substrate, a copper substrate, a brass substrate, a nickel substrate, a copper-coated substrate, or a nickel-coated substrate.

In at least one aspect, an anode includes a zinc material or a carbonaceous electrode material. For example, zinc can be used as an anode and it also provides replenishment of zinc concentration to the electrolyte solution. In at least one aspect, a deposition rate of metals on a substrate is from about 0.1 micron per minute to about 10 microns per minute, such as from about 0.5 micron per minute to about 5 microns per minute, such as from 1 micron per minute to about 2 microns per minute, for example about 1 micron per minute, about 1.5 microns per minute, about 2 microns per minute.

In at least one aspect, passing a current between the cathode and the anode (Block 306) is performed using direct current. In at least one aspect, direct current having a current density of from about 1 $mA/cm^2$ to about 300 $mA/cm^2$, such as from about 10 $mA/cm^2$ to about 250 $mA/cm^2$, such as from about 10 $mA/cm^2$ to about 200 $mA/cm^2$, such as from about 20 $mA/cm^2$ to about 80 $mA/cm^2$, such as from about 100 $mA/cm^2$ to about 200 $mA/cm^2$, for example 20 $mA/cm^2$, 80 $mA/cm^2$, 100 $mA/cm^2$, 200 $mNcm^2$ is used. For CMMA coatings, a pulsed current is used. In at least one aspect, the current density of each pulse is from about 1 $mA/cm^2$ to about 500 $mA/cm^2$, such as from about 20 $mA/cm^2$ to about 300 $mA/cm^2$, such as from about 20 $mA/cm^2$ to about 250 mA/cm$^2$, such as from about 30 mA/cm$^2$ to about 150 mA/cm$^2$, such as from about 20 mA/cm$^2$ to about 80 mA/cm$^2$, such as from about 100 mA/cm$^2$ to about 200 mA/cm$^2$, for example 20 mA/cm$^2$, 50 mA/cm$^2$, 80 mA/cm$^2$, 100 mA/cm$^2$, 200 mA/cm$^2$.

In at least one aspect, a pulsed current has a duty cycle from about 20% to about 95%, such as from about 40% to about 90%, such as from 75% to about 90%, for example, about 80%, about 85%, or about 90%. In at least one aspect, a pulsed current has a frequency ranging from about 10 Hz to about 100 Hz, such as from about 20 Hz to about 80 Hz, such as from 50 Hz to about 70 Hz, for example about 20 Hz, about 25 Hz, or about 30 Hz. In at least one aspect, one or more pulses of a series of pulses have a duration ('ON time') of from about 1 millisecond to about 1,000 milliseconds, such as from about 5 milliseconds to about 800 milliseconds, such as from about 20 milliseconds to about 500 milliseconds, such as from about 50 milliseconds to about 200 milliseconds, such as from about 10 milliseconds to about 30 milliseconds, for example about 15 milliseconds, about 25 milliseconds, or about 30 milliseconds. There is also a duration of time in between each pulse (an 'OFF time') of from about 1 millisecond to about 1000 milliseconds, depending on the 'ON time'. In at least one aspect, a duration of time in between each pulse is from about 5 milliseconds to about 500 milliseconds, such as from about 10 milliseconds to about 200 milliseconds, for example about 15 milliseconds, about 25 milliseconds, or about 30 milliseconds.

In response to passing a current between the cathode and the anode (Block 306), zinc and manganese deposit onto the cathodic substrate. Passing (Block 306) is performed until a zinc-manganese coating layer having a desired thickness is formed on the substrate. The zinc-manganese coating layer is a zinc-manganese alloy having from about 0.1 wt % manganese to about 40 wt % manganese, such as from about 0.5 wt % manganese to about 25 wt % manganese, such as from about 5 wt % manganese to about 20 wt % manganese or from about 1 wt % manganese to about 4 wt % manganese based on the total weight of the alloy. For example, the zinc-manganese alloy can have a wt % manganese of about 1 wt %, about 2 wt %, about 10 wt %, about 11 wt %, about 12 wt %, or about 20 wt %. Furthermore, the zinc-about alloy has from about 60 wt % zinc to about 99.9 wt % zinc, such as from about 80 wt % zinc to about 99 wt % zinc, for example about 99 wt % zinc, about 98 wt % zinc, about 95 wt % zinc, about 90 wt % zinc, about 89 wt % zinc, or about 88 wt % zinc, based on the total weight of the alloy.

In at least one aspect, passing (Block 306) is repeated to deposit one or more additional coating layers onto an already deposited zinc-manganese coating layer. The thickness of each layer formed on the substrate (or previously deposited layer) is controlled by the duration of an energy (current) pulse applied to the electrodes in the electrolyte solution. In at least one aspect, the total thickness of coatings deposited on a substrate is from about 1 micron to about 200 microns, such as from about 10 microns to about 100 microns, such as from about 20 microns to about 50 microns, for example about 30 microns. In at least one aspect, the total number of layers in a CMMA zinc-manganese coating of the present disclosure is from about 2 layers to about 500 layers, such as from about 10 layers to about 200 layers, such as from about 50 layers to about 150 layers, for example about 40 layers, about 50 layers, about 60 layers, about 90 layers, about 100 layers, or about 110 layers.

Aspects

Clause 1. A substrate comprising:
a zinc-manganese coating comprising a plurality of alternating layers.

Clause 2. The substrate of clause 1, wherein the substrate comprises one or more of steel, copper, brass, or nickel.

Clause 3. The substrate of clauses 1 or 2, wherein the coating has a thickness of from about 1 micron to about 100 microns.

Clause 4. The substrate of any of clauses 1-3, wherein one or more layers of the plurality of layers has a manganese content of from about 1 wt % to about 25 wt % and one or more layers of the plurality of layers has a manganese content of from about 0.1 wt % to about 5 wt %.

Clause 5. The substrate of any of clauses 1-4, wherein one or more layers of the plurality of layers has a manganese content of from about 0.5 wt % to about 1 wt % and one or more layers of the plurality of layers has a manganese content of from about 2 wt % to about 3 wt %.

Clause 6. The substrate of any of clauses 1-4, wherein one or more layers of the plurality of layers has a manganese content of from about 20 wt % to about 25 wt % and one or more layers of the plurality of layers has a manganese content of from about 0.5 wt % to about 5 wt %.

Clause 7. The substrate of any of clauses 1-4, wherein one or more layers of the plurality of layers has a manganese content of from about 10 wt % to about 15 wt % and one or more layers of the plurality of layers has a manganese content of from about 0.1 wt % to about 3.5 wt %.

Clause 8. An electrolyte solution for electroplating, the electrolyte solution comprising:
a metal salt;
boric acid;
an alkali metal chloride;
polyethylene glycol; and
a hydroxy benzaldehyde.

Clause 9. The electrolyte solution of clause 8, wherein the metal salt comprises a manganese salt and a zinc salt.

Clause 10. The electrolyte solution of clauses 8 or 9, wherein the pH of the electrolyte solution ranges from about 4 to about 6.

Clause 11. The electrolyte solution of any of clauses 8-10, wherein the manganese salt is a divalent manganese salt comprising one or more of manganese (II) sulfate, manganese (II) chloride, and manganese (II) acetate.

Clause 12. The electrolyte solution of any of clauses 8-11, wherein the concentration of the manganese salt is from about 1.5 mol/L to about 2.1 mol/L.

Clause 13. The electrolyte solution of any of clauses 8-11, wherein the zinc salt is a divalent zinc salt comprising one or more of zinc (II) sulfate, zinc (II) chloride, and zinc (II) acetate.

Clause 14. The electrolyte solution of any of clauses 8-11 or 13, wherein the concentration of the zinc salt ranges from about 0.25 mol/L to about 0.35 mol/L.

Clause 15. The electrolyte solution of any of clauses 8-14, wherein:
the concentration of boric acid ranges from about 0.3 mol/L to about 0.5 mol/L,
the alkali metal chloride is potassium chloride and the concentration of the alkali metal chloride ranges from about 1.5 mol/L to about 2.5 mol/L;
the concentration of the polyethylene glycol ranges from about 0.0005 mol/L to about 0.005 mol/L; and
the concentration of the hydroxy benzaldehyde ranges from about 0.001 mol/L to about 0.01 mol/L.

Clause 16. An electrolyte solution for electroplating, the electrolyte solution comprising:
a zinc salt;
a manganese salt; and
an alkali metal citrate.

Clause 17. The electrolyte solution of clause 16, wherein the pH of the electrolyte solution is from about 4 to about 6.

Clause 18. The electrolyte solution of clauses 16 or 17, wherein the manganese salt is a divalent manganese salt comprising one or more of manganese (II) sulfate, manganese (II) chloride, and manganese (II) acetate.

Clause 19. The electrolyte solution of any of clauses 16-18, wherein the concentration of the manganese salt ranges from about 0.2 mol/L to about 0.4 mol/L.

Clause 20. The electrolyte solution of any of clauses 16-19, wherein the zinc salt is a divalent zinc salt comprising one or more of zinc (II) sulfate, zinc (II) chloride, and zinc (II) acetate.

Clause 21. The electrolyte solution of any of clauses 16-20, wherein the concentration of the zinc salt ranges from about 0.2 mol/L to about 0.4 mol/L.

Clause 22. The electrolyte solution of any of clauses 16-21, wherein the concentration of the alkali metal citrate ranges from about 0.5 mol/L to about 0.7 mol/L.

Clause 23. An electrolyte solution for electroplating, the electrolyte solution comprising:
a zinc salt;
a manganese salt;
an alkali metal citrate;
an alkali metal acetate;
a citric acid;
glycine; and
thiamine hydrochloride.

Clause 24. The electrolyte solution of clause 23, wherein:
the concentration of the manganese salt ranges from about 0.4 mol/L to about 0.8 mol/L;
the concentration of the zinc salt ranges from about 0.1 mol/L to about 0.4 mol/L;
the concentration of the alkali metal citrate ranges from about 0.01 mol/L to about 0.04 mol/L;
the concentration of the alkali metal acetate ranges from about 0.4 mol/L to about 1 mol/L;
the concentration of the citric acid ranges from about 0.05 mol/L to about 0.2 mol/L;
the concentration of the glycine ranges from about 0.1 mol/L to about 0.3 mol/L; and
the concentration of the thiamine hydrochloride ranges from about 0.001 mol/L to about 0.004 mol/L.

Clause 25. The electrolyte solution of clauses 23 or 24, wherein the pH of the electrolyte solution is from about 4 to about 6.

Clause 26. A method for electrodepositing a zinc-manganese alloy on a substrate, the method comprising:
introducing a cathode and an anode into an electrolyte solution comprising a zinc salt, a manganese salt, wherein the electrolyte solution selected from:
(a) boric acid, an alkali metal chloride, polyethylene glycol, and a hydroxy benzaldehyde;
(b) an alkali metal citrate; or
(c) an alkali metal citrate, an alkali metal acetate, a citric acid, glycine, and a thiamine; and
passing a first current between the cathode and the anode through the electrolyte solution to deposit a first layer containing zinc and manganese onto the cathode.

Clause 27. The method of clause 26, wherein the cathode is a steel substrate, a copper substrate, a brass substrate, a nickel substrate, a copper-coated substrate, or a nickel-coated substrate.

Clause 28. The method of clauses 26 or 27, wherein the anode is a zinc material or a carbonaceous electrode material.

Clause 29. The method of any of clauses 26-28, wherein passing a current comprises passing a current between the cathode and the anode at a current density from about 1 mNcm$^2$ to about 200 mA/cm$^2$.

Clause 30. The method of any of clauses 26-29, wherein the pulsed current is a series of pulses and each pulse has a duration of from about 20 milliseconds to about 800 milliseconds.

Clause 31. The method of any of clauses 26-30, wherein the temperature of the electrolyte solution is maintained at a temperature from about 20° C. to about 35° C. while passing the current.

Clause 32. The method of any of clauses 26-31, further comprising depositing a second layer comprising zinc and manganese onto the first layer by passing a second current between the cathode and the anode, the second current having a current density different than a current density of the first current.

Clause 33. The method of any of clauses 26-32, further comprising depositing a second layer comprising zinc and manganese onto the first layer by passing a second current between the cathode and the anode, the second current having the same current density as a current density of the first current.

Clause 34. The method of any of clauses 26-33, further comprising repeating passing currents between the cathode and the anode to form a coating having a plurality of alternating layers having a manganese content, wherein the currents have substantially the same duration and the layers have substantially the same thickness and substantially the same manganese content.

Clause 35. The method of any of clauses 26-32, further comprising repeating passing currents between the cathode and the anode to form a coating having a plurality of alternating layers, wherein the layers have substantially the same thickness and two or more of the layers have a different manganese content.

Clause 36. The method of any of clauses 26-32, further comprising repeating passing currents between the cathode and the anode to form a coating having a plurality of alternating layers, wherein two or more of the layers have a different thickness and two or more of the layers have a different manganese content.

Clause 37. The method of any of clauses 26-32, further comprising repeating passing currents between the cathode and the anode to form a coating having a plurality of alternating layers comprising:
a first layer having a first manganese content,
a second layer having a second manganese content different than the first manganese content,
a third layer having the same manganese content as the first layer, and
a fourth layer having the same manganese content as the second layer.

Clause 38. The method of any of clauses 26-32, further comprising repeating passing currents between the cathode and the anode to form a coating having a plurality of alternating layers, wherein each layer has substantially the same thickness and each layer has a different manganese content.

Clause 39. The method of any of clauses 26-32, further comprising repeating passing currents between the cathode and the anode to form a coating having a plurality of alternating layers, wherein each layer has a different thickness and each layer has a different manganese content.

It is to be understood that while the present disclosure has been described in conjunction with the specific aspects thereof, the foregoing description is intended to illustrate and not limit the scope of the present disclosure. Other aspects, advantages and modifications will be apparent to those skilled in the art to which the present disclosure pertains.

EXAMPLES

Steel substrates used in the following examples were mild steel, 4130 steel, or 4340 steel specimens.

Example 1: The first four components of Example 1 were mixed together and dissolved in water followed by the last two components. The pH of Example 1 was 5.

| Example 1 | | |
| --- | --- | --- |
| Zinc chloride (ZnCl$_2$) | 41 g/L | 0.3M |
| Manganese chloride (MnCl$_2$ · 4H$_2$O) | 356 g/L | 1.8M |
| Boric acid (H$_3$BO$_3$) | 25 g/L | 0.4M |
| Potassium chloride (KCl) | 135 g/L | 1.8M |
| Polyethylene Glycol (6000) | 6 g/L | |
| Para-Hydroxy benzaldehyde (HOC$_6$H$_4$CHO) | 0.5 g/L | 0.004M |

Example 2: The components of Example 2 were mixed in a stepwise manner starting with the complexing agent first followed by metal salts. The pH of Example 2 was 5.4.

| Example 2 | | |
| --- | --- | --- |
| Zinc sulphate (ZnSO$_4$ · 7H$_2$O) | 72 g/L | 0.25M |
| Manganese sulphate (MnSO$_4$ · H$_2$O) | 42.5 g/L | 0.25M |
| Na citrate (C$_6$H$_5$Na$_3$O$_7$ · 2H$_2$O) | 176.5 g/L | 0.60M |

Using the electrolyte solutions of Example 1, CMMA zinc-manganese alloy coatings were deposited by a pulse current method by alternating pulses at two different current densities, 20 mA/cm$^2$ and 80 mA/cm$^2$. The pulse duration of each pulse was performed such that substantially equal layer thicknesses at each current density were achieved and 50 layers at each current density were deposited alternatively using a Dynatronix Pulse rectifier. A total of 100 layers having a total thickness of about 20 microns was achieved. The deposition was performed in a single bath vessel.

For the electrolyte solution of Example 1, the zinc-manganese alloy layers deposited at 20 mA/cm$^2$ had a manganese content of about 0.8 wt %, while the zinc-manganese alloy layers deposited at 80 mA/cm$^2$ had a manganese content of about 2.7 wt %.

Using the electrolyte solutions of Example 2, CMMA zinc-manganese alloy coatings were deposited by a pulse current method by alternating pulses at two different current densities, 100 mA/cm$^2$ and 200 mA/cm$^2$. The pulse duration of each pulse was performed such that substantially equal layer thicknesses at each current density were achieved and 50 layers at each current density were deposited alternatively using a Dynatronix Pulse rectifier. A total of 100 layers having a total thickness of about 30 microns was achieved. The deposition was performed in a single bath vessel.

For the electrolyte solution of Example 2, the zinc-manganese alloy layers deposited at 100 mA/cm$^2$ had a manganese content of about 2 wt %, while the zinc-manganese alloy layers deposited at 200 mA/cm$^2$ had a manganese content of about 20.6 wt %.

Example 3: The components of Example 3 were mixed in a stepwise manner starting with the complexing agents first followed by metal salts. The pH of Example 3 was 5.

| Example 3 | | |
| --- | --- | --- |
| Zinc sulphate (ZnSO$_4$ ·7H$_2$O) | 50 g/L | 0.174M |
| Manganese sulphate (MnSO$_4$ · H$_2$O) | 100 g/L | 0.59M |
| Na acetate (CH$_3$COONa) | 60 g/L | 0.731M |
| Na citrate (C$_6$H$_5$Na$_3$O$_7$ · 2H$_2$O) | 5.3 g/L | 0.018M |
| Glycine (NH$_2$CH$_2$COOH) | 11 g/L | 0.146M |
| Citric acid (C$_6$H$_8$O$_7$ · H$_2$O) | 21.2 g/L | 0.1M |
| Thiamine hydrochloride (C$_{12}$H$_{17}$ClN$_4$OS · HCl) | 0.5 g/L | 0.0015M |

Using the electrolyte solutions of Example 3, CMMA zinc-manganese alloy coatings were deposited by a pulse current method by alternating pulses at two different current densities, 100 mA/cm$^2$ and 200 mA/cm$^2$. The pulse duration of each pulse was performed such that substantially equal layer thicknesses at each current density were achieved and 50 layers at each current density were deposited alternatively using a Dynatronix Pulse rectifier. A total of 100 layers having a total thickness of about 25 microns was achieved. The deposition was performed in a single bath vessel.

For the electrolyte solution of Example 3, the zinc-manganese alloy layers deposited at 100 mA/cm$^2$ had a manganese content of about 0.8 wt %, while the zinc-manganese alloy layers deposited at 200 mA/cm$^2$ had a manganese content of about 3.1 wt %.

Salt Spray Testing (ASTM B 117)

A conversion coating, chromate coating ALODINE 1200, was disposed on the coated samples of Example 1 and Example 2. A conversion coating, Trichrome HB 1701 CF, was disposed on the coated sample of Example 3. It was discovered that the CMMA coatings of Example 1, Example 2, and Example 3 were receptive to these conversion coatings, as evidenced by corrosion protection data. The passivated samples were tested for corrosion protection by Open Circuit Potential measurements and in a salt spray chamber (according to ASTM B 117).

Salt spray results of zinc-manganese CMMA coatings deposited from electrolyte solution of Example 1 and passivated with Alodine 1200 indicate corrosion protection of steel substrates of 500 hours or more. No red rust was observed for 1,000 hours or more. No blistering or white rust of the conversion coating was observed for about 100 hours or more, indicative that the CMMA coating is receptive to the ALODINE 1200 conversion coating.

Salt spray results of zinc-manganese CMMA coatings deposited from electrolyte solution of Example 2 and passivated with Alodine 1200 indicate corrosion protection of steel substrates of 500 hours or more. No red rust was observed for 500 hours or more. No blistering or white rust of the conversion coating was observed for 100 hours or more, indicative that the CMMA coating is receptive to the ALODINE 1200 conversion coating.

Salt spray results of zinc-manganese CMMA coatings deposited from electrolyte solution of Example 3 and passivated with Trichrome HB 1701 CF indicate corrosion protection of steel substrates of 1,000 hours or more. No red rust was observed for 1,000 hours or more. No blistering or white rust of the conversion coating was observed for 100 hours or more, indicative that the CMMA coating is receptive to the Trichrome HB 1701 CF conversion coating.

Without being bound by theory, it is believed that one of the two alternating types of layers (e.g., the layers with lower manganese concentration) corrode and the corrosion product of the corroded layer blocks the pores of adjacent layers having higher manganese concentration, making the overall CMMA layer more protective than a monolithic zinc-manganese alloy layer. Hence, zinc-manganese alloy CMMA coatings can also be equally protective without passivation.

Open Circuit Potential:

Open circuit potential was used as a quantitative criterion for the corrosion protection ability of zinc-manganese alloy coatings of the present disclosure disposed on steel substrates. The open circuit potential of a coating should be negative to steel, which indicates that the coating provides sacrificial protection to the steel. The open circuit potential is a parameter which indicates the thermodynamic tendency of a material to electrochemical oxidation in a corrosive medium. The open circuit potential of these zinc-manganese alloy coatings was measured in distilled water and 3.5% NaCl solution for 15 days as per ASTM G 82. Electrochemical cells were made with the coated surface as the working electrode and a Calomel electrode was used as reference electrode. The temperature during an open circuit potential measurement was maintained at about 30° C.

Figure 4A:
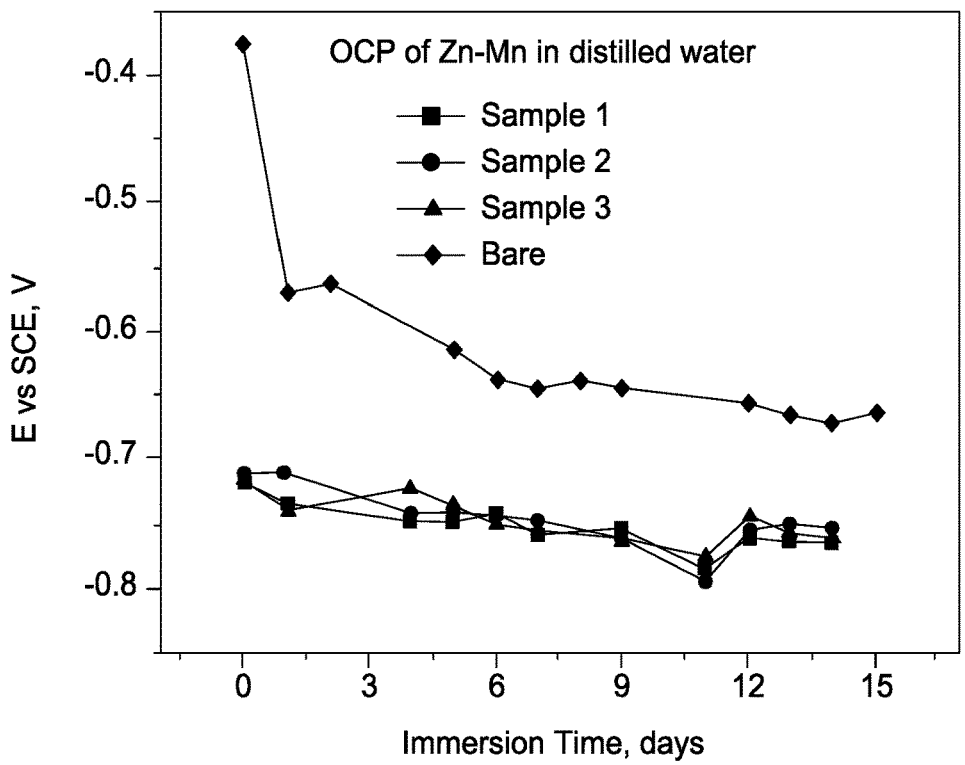
FIG. 4A is a graph illustrating open circuit potential of zinc-manganese CMMA coatings in distilled water according to an aspect of the present disclosure.
Figure 4B:
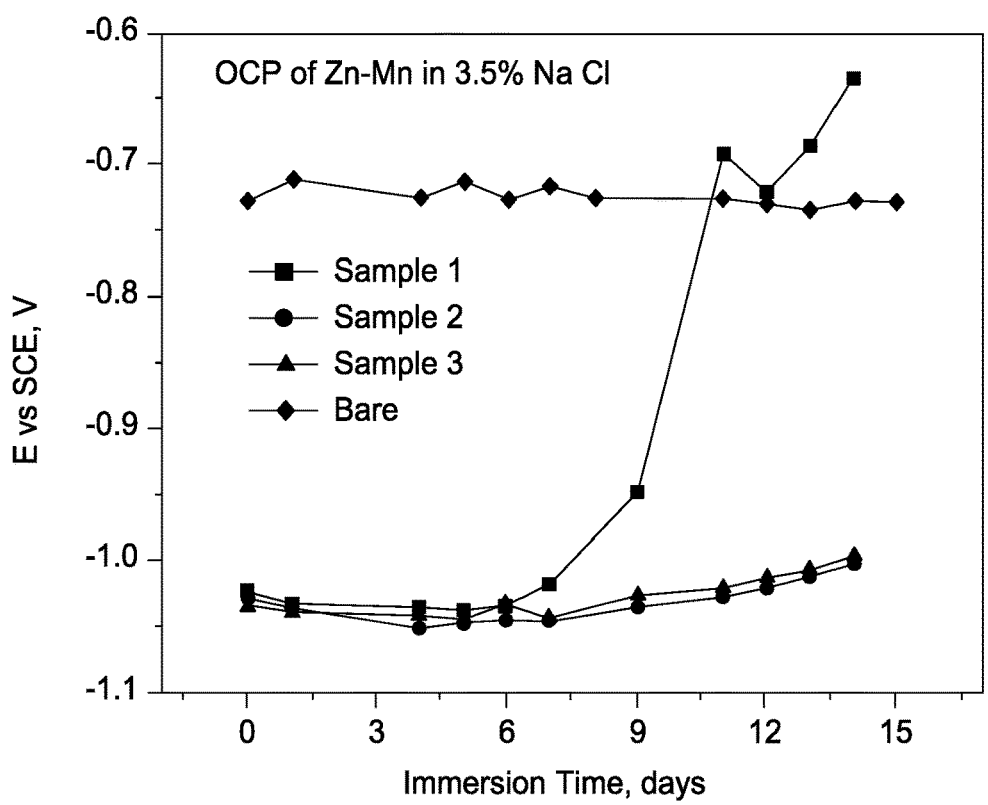
FIG. 4B is a graph illustrating open circuit potential of zinc-manganese CMMA coatings in salt water according to an aspect of the present disclosure.

FIGS. 4A and 4B are graphs illustrating open circuit potential of zinc-manganese CMMA coatings in distilled water and salt water respectively. The zinc-manganese coatings were deposited from the electrolyte solution of Example 2 and passivated with Alodine 1200. The zinc-manganese coatings (samples 1, 2, and 3) were prepared by pulsing at an alternating current density of 100 mA/cm$^2$ and 200 mA/cm$^2$ until a total of 100 layers were obtained for each sample. As shown in FIGS. 4A and 4B, open circuit potential of the coatings was measured over a period of 14 days and was found to be -ve to bare 4130 steel. Hence, these zinc-manganese alloy coatings provide cathodic protection to steel in both distilled water and salt water.

Figure 5A:
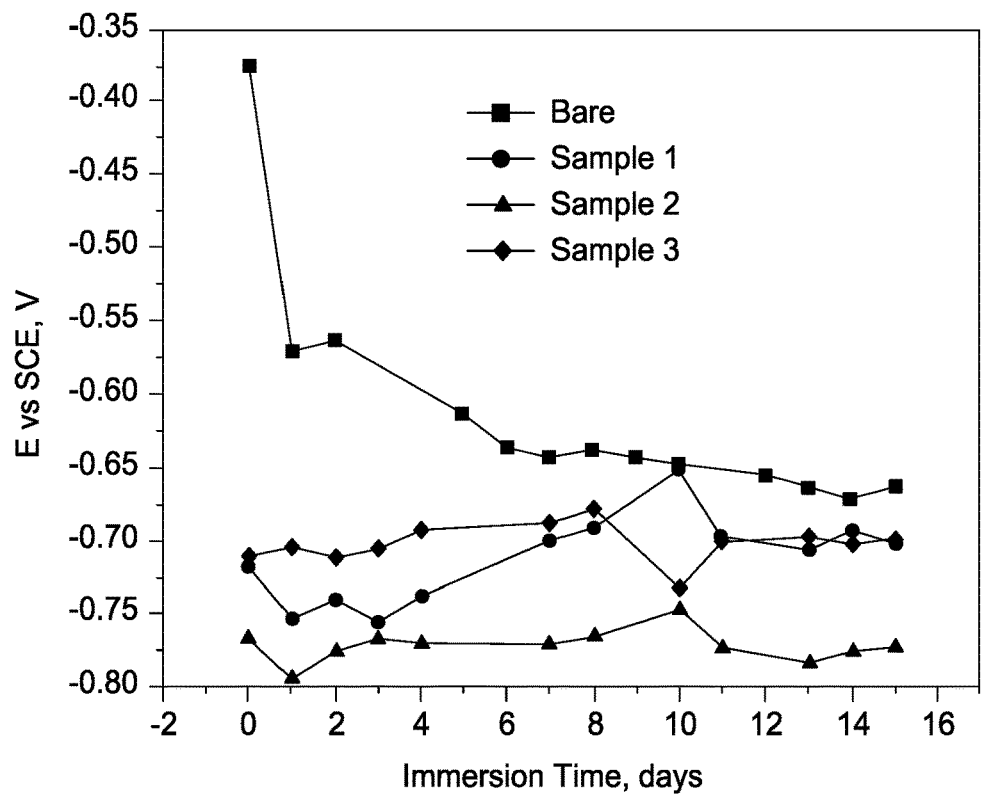
FIG. 5A is a graph illustrating open circuit potential of zinc-manganese CMMA coatings in distilled water according to an aspect of the present disclosure.
Figure 5B:
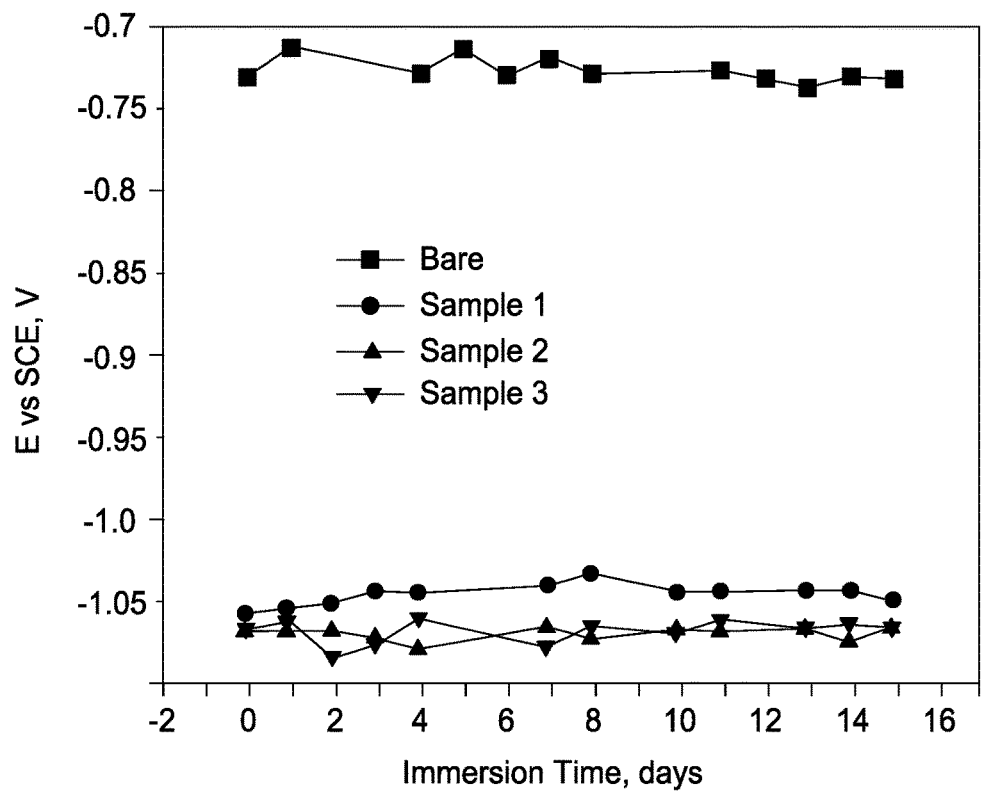
FIG. 5B is a graph illustrating open circuit potential of zinc-manganese CMMA coatings in salt water according to an aspect of the present disclosure.

FIGS. 5A and 5B are graphs illustrating open circuit potential of zinc-manganese CMMA coatings in distilled water and salt water. The zinc-manganese coatings were deposited from the electrolyte solution of Example 3 and passivated with Trichrome HB 1701 CF. The zinc- manganese coatings (samples 1, 2, and 3) were prepared by pulsing at an alternating current density of 100 mA/cm$^2$ and 200 mA/cm$^2$ until a total of 100 layers were obtained for each sample. As shown in FIGS. 4A and 4B, open circuit potential of the coatings was measured over a period of 14 days and was found to be -ve to bare 4130 steel. As shown in FIGS. 5A and 5B, these zinc-manganese alloy coatings provide cathodic protection to steel in distilled water and salt water.

Hydrogen Embrittlement

Hydrogen Embrittlement (HE) tests were performed according to ASTM F 519 using Type 1a.1 specimens having a notch. For HE testing, a load is applied to a notch on a High Strength Steel 4340 sample without any coating to determine an average Notch Fracture Strength (NFS) value based from three uncoated samples. Average NFS for the High Strength Steel 4340 sample was determined to be 3,953 Kg for 200 hours. No failure was observed under ASTM F 519.

Alloys, as described above, were electrodeposited onto new High Strength Steel 4340 samples having a notch. The zinc-manganese CMMA coated specimens were passivated, baked (190° C. for 24 hours). Then, 75% load of the average NFS value (75% of 3,953 Kg =2,964.75 Kg, about 2,965 Kg) was applied to the samples and held at this load for 200 hours. No fracturing was observed, indicating that these coatings pass the HE test.

Overall, the present disclosure provides improved electrolyte solutions for electrodeposition of zinc-manganese alloys, methods of forming electrolyte solutions, methods of electrodepositing zinc-manganese alloys, and multilayered zinc-manganese alloys.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A substrate comprising:
a zinc-manganese coating having a thickness of about 1 micron to about 100 microns and comprising a plurality of alternating layers, the layers having a zinc content and a manganese content, the substrate comprising one or more of steel, copper, brass, or nickel,
wherein:
a first one or more layers of the plurality of layers has a manganese content of about 1 wt % to about 25 wt %,
a second one or more layers of the plurality of layers has a manganese content of about 0.1 wt % to about 5 wt %, the second one or more layers of the plurality of layers being different from the first one or more layers of the plurality of layers.

2. The substrate of claim 1, wherein a third one or more layers of the plurality of layers has a manganese content of about 0.5 wt % to about 1 wt %.

3. The substrate of claim 2, wherein a fourth one or more layers of the plurality of layers has a manganese content of about 2 wt % to about 3 wt %.

4. The substrate of claim 1, wherein a third one or more layers of the plurality of layers has a manganese content of about 10 wt % to about 15 wt %.

5. The substrate of claim 4, wherein a fourth one or more layers of the plurality of layers has a manganese content of about 0.1 wt % to about 3.5 wt %.

6. A method for electrodepositing a zinc-manganese alloy on a substrate, the method comprising:
- introducing a cathode and an anode with a solution comprising:
  - a zinc salt, a manganese salt, an alkali metal citrate, an alkali metal acetate, a citric acid, glycine, and a thiamine; and
- passing a first current between the cathode and the anode through the electrolyte solution to deposit a first layer containing zinc and manganese onto the cathode.

7. The method of claim 6, wherein the anode is a zinc material or a carbonaceous electrode material.

8. The method of claim 6, wherein passing a current comprises passing a current between the cathode and the anode at a current density of about 1 mA/cm$^2$ to about 200 mA/cm$^2$.

9. The method of claim 8, wherein the current is a series of pulses and each pulse has a duration of about 20 milliseconds to about 800 milliseconds.

10. The method of claim 9, wherein the temperature of the solution is maintained at a temperature of about 20° C. to about 35° C. while passing the current.

11. The method of claim 6, further comprising depositing a second layer comprising zinc and manganese onto the first layer by passing a second current between the cathode and the anode, the second current having a current density different than a current density of the first current.

12. The method of claim 6, further comprising depositing a second layer comprising zinc and manganese onto the first layer by passing a second current between the cathode and the anode, the second current having substantially the same current density as a current density of the first current.

13. The method of claim 11, further comprising repeating passing currents between the cathode and the anode to form a coating having a plurality of alternating layers having a manganese content, wherein the currents have substantially the same duration and the layers have substantially the same thickness and substantially the same manganese content.

14. The method of claim 11, further comprising repeating passing currents between the cathode and the anode to form a coating having a plurality of alternating layers, wherein the layers have substantially the same thickness and two or more of the layers have a different manganese content.

15. A substrate comprising:
- a zinc-manganese coating having a thickness of about 1 micron to about 100 microns and comprising a plurality of alternating layers, the layers having a zinc content and a manganese content, the substrate comprising one or more of steel, copper, brass, or nickel, wherein:
  - a first one or more layers of the plurality of layers has a manganese content of about 1 wt % to about 25 wt %, and
  - a second one or more layers of the plurality of layers has a manganese content of about 20 wt % to about 25 wt %, the second one or more layers of the plurality of layers being different from the first one or more layers of the plurality of layers.

16. The substrate of claim 15, wherein a third one or more layers of the plurality of layers has a manganese content of about 0.5 wt % to about 5 wt %.

17. The substrate of claim 1, wherein the second one or more layers is disposed on the first one or more layers.

18. The substrate of claim 15, wherein the second one or more layers is disposed on the first one or more layers.

19. The substrate of claim 16, wherein a third one or more layers of the plurality of layers has a manganese content of about 0.5 wt % to about 1 wt %.

20. The substrate of claim 19, wherein the manganese content of the first one or more layers of the plurality of layers is different than the manganese content of the second one or more layers.

* * * * *